July 17, 1956
R. C. FERGASON
2,754,650
COTTON HARVESTER WITH MECHANICAL
AND PNEUMATIC CONVEYING MEANS
Filed June 18, 1953
2 Sheets-Sheet 1
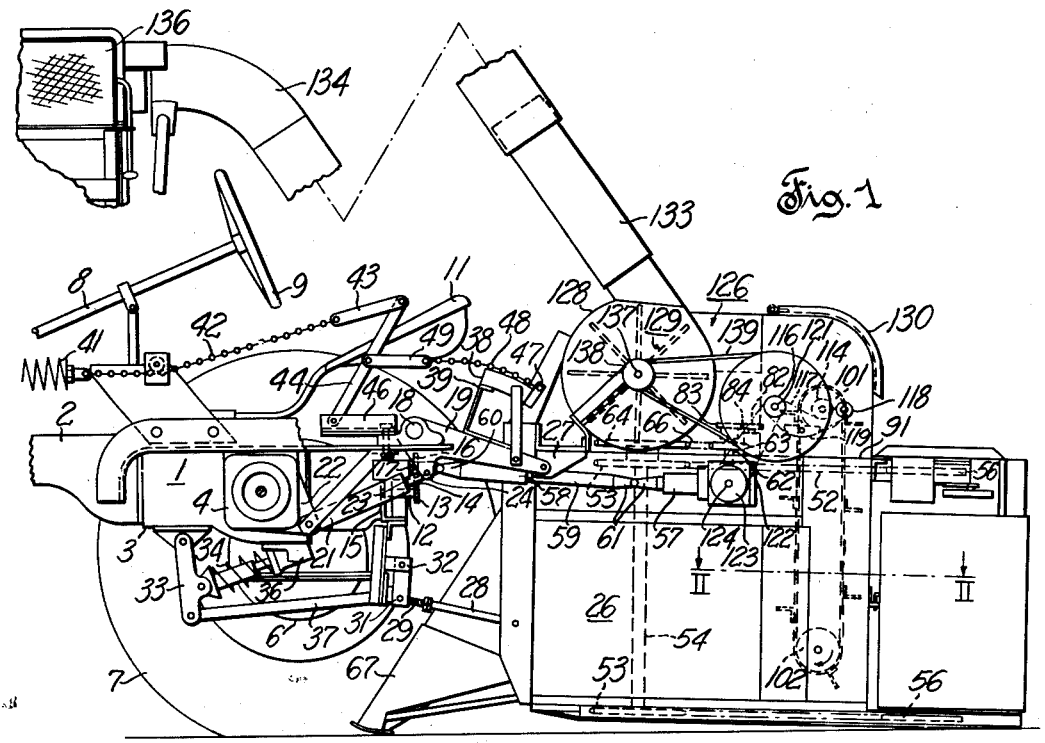
Fig. 1
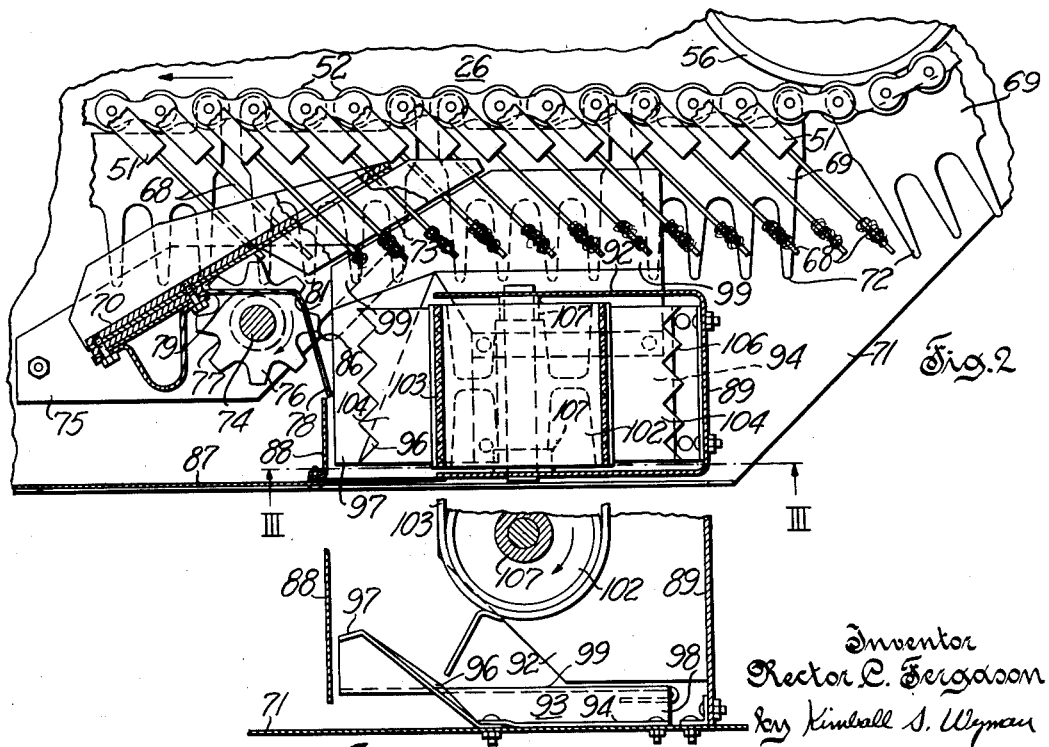
Fig. 2
Fig. 3
Inventor
Rector C. Fergason
by Kimball S. Wyman
Attorney

United States Patent Office 2,754,650
Patented July 17, 1956

2,754,650

COTTON HARVESTER WITH MECHANICAL AND PNEUMATIC CONVEYING MEANS

Rector C. Fergason, Gadsden, Ala., assignor to Allis-Chalmers Manufacturing Company, Milwaukee, Wis.

Application June 18, 1953, Serial No. 362,502

12 Claims. (Cl. 56—30)

This invention relates to a cotton harvesting machine and is especially concerned with the provision of improved means for conveying picked cotton from the stripping of doffing mechanism of a rotary spindle type machine to a receptacle spaced from such mechanism.

In prior machines of this type, it has been customary to convey picked cotton from the stripping or doffing mechanism to a receptacle either by a pneumatic means including a blower or by an endless belt conveyer having flights thereon. However, the use of a pneumatic conveying means has not been entirely satisfactory for several reasons. First, unless an expensive pneumatically sealed type of duct structure is employed, leakage throughout the necessarily long inlet portion materially increases power requirements as does also the creation of an inlet suction sufficient to elevate and convey picked cotton to the blower. Second, the creation of a high degree of inlet suction results in much of the foreign material such as dirt and trash being conveyed along with the cotton which, depending upon the foreign material content, may adversely affect grade and price. And third, passage of foreign material through the blower increases the wear on relatively moving parts which, in turn, increases maintenance cost.

Further, the use of an endless conveyer is also objectionable in that the cotton balls or wads removed from the rotating spindles remain in a tightly compacted form during conveyance to the receptacle or basket and consequently in the absence of the fluffing action afforded by a blower much of the foreign material remains in the cotton entering the receptacle. In addition, the relative locations of the picking unit and receptacle often present construction difficulties rendering the use of endless conveyers impractical if not impossible because of high initial cost, inefficient operation, and excessive maintenance.

In accordance with the present invention, it has been discovered that by combining pneumatic and endless conveying means in a novel manner both initial and maintenance costs are materially reduced and operating efficiency, together with the removal of foreign material, is materially improved.

Therefore a principal object of the present invention is the provision of a cotton harvesting machine having a pneumatic conveying means combined with an endless elevating conveyer in a novel manner which minimizes suction requirements and effectively removes much of the foreign material from the cotton prior to its entering the blower.

Another object of the present invention resides in the provision of an improved picked cotton conveying means utilizing an endless conveyor having flights thereon for elevating the cotton to a point adjacent a cotton conveying air stream while permitting foreign material to gravitate to a point of removal adjacent the bottom of the picking unit in combination with a duct construction operatively associated with the upper end of the elevating conveyer in a novel manner designed to effectively use clean air in conveying cotton away from the endless conveyer and to the receptacle without adversely affecting the aforementioned gravity separation of foreign material, or the removal of such separated material.

Still another object of the present invention is the provision of a pneumatic conveying means utilizing an improved impeller and casing construction which eliminates seed cracking and affords free movement of the cotton in a conveying stream of clean air induced by operation of the impeller.

Accordingly, the present invention may be considered as comprising the various features of construction, combination and/or subcombination as is hereinafter more fully set forth in the following detailed description and appended claims. Further, the significance of the aforementioned features and of apparatus for practicing the invention will be readily apparent by reference to the accompanying drawings in connection with the aforementioned description, the drawings illustrating a preferred embodiment of the invention, wherein:

Fig. 1 is a fragmentary side elevation of a portion of a cotton picking machine including a spindle type picking unit, certain of the parts being removed and/or broken away in the interest of showing the operative coaction of a novel combination of parts embodying the invention;

Fig. 2 is an enlarged sectional view taken generally on line II—II of Fig. 1;

Fig. 3 is a further sectional view taken on line III—III of Fig. 2;

Figure 4:
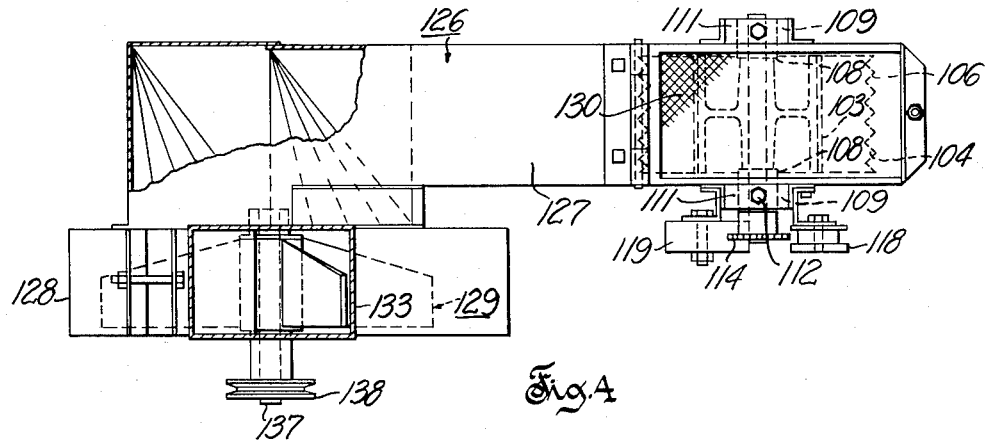
Fig. 4 is an enlarged plan view of the impeller, the upper end of the elevating conveyer, and duct structure uniting same, with a part of the structure broken away and shown in section to better show the nature of the impeller inlet.

Referring to Figs. 1 and 2 of the drawings, apparatus embodying the invention is illustrated as applied to a conventional tractor 1 of which only the rear portion is shown in the interest of simplification. The tractor is of the type including a torque tube 2, a transmission housing 3 secured to the rear end of torque tube 2 and merging with an intermediate portion of a transverse rear axle structure 4 which is of the drop axle type and terminates at opposite ends in depending final drive housings 6 rotatably supporting the rear traction wheels 7. In addition, the tractor is provided with a suitable steering column 8 terminating in a wheel 9 disposed in accessible relation to an operator's seat 11 overlying the axle structure 4 in somewhat rearward relation thereto. Moreover, the tractor includes a known power take-off mechanism comprising the shaft 12 mounting a sprocket 13 which is connected by a chain 14 with a laterally offset sprocket 16 operatively supported on a stub shaft 17 mounted on a bracket structure 15. Further, it is to be understood that the tractor is provided with the usual engine, transmission, and clutch controls, which are neither shown or described as they form no part of the present invention.

The tractor also includes a conventional lift mechanism comprising a transverse rock shaft 18 rotatably supported on bracket mounted bearings (not shown), a pair of transversely aligned rearwardly extending similar lift arms 19, of which only the near side one is shown, and a hydraulic ram for each lift arm having its cylinder portion 21 pivotally secured to a bracket 22 attached to axle structure 4 and a piston rod portion 23 swingably connected to a depending portion 24 of lift arm 19. In addition, it is to be understood that the tractor is provided with a suitable hydraulic system and controls disposed in accessible relation to the tractor seat for selectively expanding and contracting the rams and thereby actuating the lift mechanism in a known manner. A further description of the lift mechanism and the hydraulic system and controls therefor is unnecessary for a complete understanding of the present invention. However, if additional information should be desired concerning these features, a suitable system and lift mechanism are disclosed in the U. S. Patents, W. F. Strehlow et al., 2,611,306 and 2,611,307.

The cotton harvesting mechanism involved includes a picker unit 26 having laterally aligned topside portions 27 (only the near side one is shown), swingably attached to the rear ends of the lift arms 19. The unit 26 is additionally supported by a compression load transmitting stabilizing link having telescoped sections of which the rear section 28 is swingably connected to a lower forward side portion of the picker unit, and of which the forward section 29 is similarly connected to the lower end of a lever 31 pivoted on a rearward projection 32 of the depending bracket structure 15. The tractor is provided with a depending lever 33 braced against longitudinal movement by a compression spring 34 having one end connected to an intermediate portion of the lever 33 and its opposite end operatively supported in a depending bracket 36. Bracket structure 15 is made longitudinally fixed by a rigid element 37 having its forward end connected with the lower end of lever 33 and its rear end connected with a lower portion of the bracket structure. Section 29 of the stabilizing link is externally threaded and provided with a pair of nuts coacting to adjustably vary the effective length of said link.

Further, the picking unit mounting includes a counterbalance means comprising a cam segment 38 detachably mounted on the near side lift arm 19 by means of a bracket 39. The forward end of the tractor (not shown) suitably mounts one end of a balance spring 41 having its rear end operatively connected with the forward end of a chain or cable 42. The rear end of chain 42 is operatively connected by means of a link 43 to the upper end of a lever 44 which, in turn, is pivoted at its lower end on a bracket 46 carried by the axle structure 4. Anchored to an upstanding projection 47 at the rear end of cam segment 38 and extending forwardly therefrom is a chain 48 which passes over the top cam surface of the segment and has its forward end connected with the rear end of a link 49 which, in turn, is pivoted at its forward end on an intermediate portion of the lever 44. The spring 41 is normally effective to exert considerable pull through the chain and linkage systems 42, 43, 44, 49, 48 upon the cam segment 38 in order to counterbalance a substantial part of the weight of the picker unit 26. The cam segment 38 is so arranged that the effective lever arm on which the chain 48 acts with respect to the axis of shaft 18 increases as the arm 19 swings upward and the tension of spring 41 decreases, so that the counterbalancing effect of the spring 41 will be substantially equal for all vertically adjusted positions of the picker unit 26.

In positioning the picker for operation, the lift mechanism is lowered until the unit rests on the ground whereupon the length of the stabilizing link 28, 29 is adjusted to raise the forward end of the unit to an upwardly tilted position such as shown in Fig. 1 to prevent the front end from digging into the ground. In addition, the tension of the balance spring 41 is adjusted by a known means (not shown) so that the weight of the picker transmitted to the ground is sufficient to prevent bouncing in traveling over uneven ground, it being appreciated that the utmost in tractive effort is attained when most of the weight of the picker is transmitted through the lift mechanism to the rear traction wheels.

The picker unit 26 comprises a housing supported by generally rigid frame structure (not shown), the housing enclosing vertically disposed spindle carrying slats 51 having their opposite ends hingedly mounted on endless carriers, such as the chains 52 passing around a pair of vertically spaced forward drive sprockets 53 fixed on a rotatable vertical shaft 54, and a pair of vertically spaced rear idler wheels or sprockets 56 mounted on a similar shaft (not shown). The picker unit is provided with a power input shaft 57 and power is controllably transmitted thereto from stub shaft 17 of the power take-off mechanism through a pair of separable telescoped shaft sections, the forward section 58 and the rear section 59 being flexibly connected to the stub shaft 17 and the input shaft 57, respectively, by means of the universal couplings 60 and 61. Input shaft 57 is drivingly connected with a vertical stub shaft 62 having a sprocket 63 thereon which in turn drives a sprocket 64 fixed on vertical shaft 54 by means of a chain 66. The forward end of the unit is provided with a gathering or divider point 67 and it is to be understood that the chains and slats travel in the direction indicated by the arrow in Fig. 2 and that the active course of the slats, each of which operatively mounts a vertical series of rotatable picking spindles 68, travels rearward through a suitable plant confining tunnel (not shown) wherein the spindles contact and remove the cotton bolls from plants. In general, the plant tunnel, the spindle coaction, and the spindle mounting therewith are similar to that shown in Rust Patent, U. S. 2,085,046. Therefore, a further description of that portion of the unit is omitted since for purposes of the present invention, it is only necessary to know that during operation the spindles which are moving forward from the rear idler wheels 56, as shown in Fig. 2, may have wads or bolls of cotton wrapped therearound.

Referring further to Fig. 2, it will be noted that the lower chain 52 is provided with a series of outwardly projecting spindle guards 69 closely overlying the floor or bottom 71 of the unit and presenting terminal finger portions 72. Further, the unit is provided with a vertical series of stripping elements 73 extending outward and forward in oblique relation to the forward course of the slats 51. The stripping elements are mounted on a vertical standard 70 secured to a floor plate 75, the elements being vertically spaced apart sufficiently for the passage of a spindle therebetween. The stripping elements are designed to engage a cotton boll wrapped around a spindle 68 whereupon the boll is pulled from the end of the spindle as the latter passes forward between the outer portions of the stripping elements. In addition, the unit is provided with a stripper cleaner comprising a rotatably mounted vertical shaft 74 disposed in adjacent rearward relation to the outer portions of the stripping elements, this shaft having a plurality of disks 76 thereon presenting a scalloped periphery 77. These disks are rotated in the direction indicated by the arrow thereon and the periphery of each disk passes closely adjacent the outer ends of a pair of the stripping elements in approximate alignment with the spindle receiving space therebetween, consequently the peripheries of these disks act to remove any of the smaller wads of cotton which tend to become wedged between the outer ends of the stripping elements and to direct the wads or bolls removed from the spindles and/or stripping elements slightly rearward and outward toward the near side wall of the machine as viewed in Figs. 1 and 2.

The disks 76 are provided with a vertical series of shields 78 which are carried by the stripping elements 73 to extend rearward therefrom, these shields presenting a horizontally slotted vertical wall through which project the scalloped peripheries of the disks 76, this slotted wall including an inner portion 79 which extends rearward for a short distance in generally parallel relation to the direction of spindle travel and an outer portion 81 which extends outward in slightly rearward oblique relation to the inner portion thereof. Power for rotating the stripper cleaner shaft 74 (Fig. 2), and cleaner disks 76 is derived from a sprocket 83 mounted on the upper end of shaft 62 (Fig. 1) above the chain drive sprocket 63. The upper end of shaft 74 is provided with a driven sprocket 82 (Fig. 1) which is horizontally aligned and connected with the sprocket 83 by means of a drive chain 84 (Fig. 1). The bottom wall 71 (Fig. 2) of the unit is provided with an elongated trash discharge opening 86, and the finger portions 72 of the spindle guards pass over the inner portion of the opening 86 and function to move dirt and trash from the rear of the unit forward over the floor 71 and into this opening.

The near side wall 87 of the picker unit 26 is provided with an inturned vertical wall portion 88 presenting a terminal inner edge disposed in approximate edge abutting relation to the outer vertical edge presented by the outer wall portion 81 of the disk shields 78. In addition, the near side wall is formed in part by one side of an elongated housing 89 disposed in rearward spaced opposed relation to the vertical wall formed by the coaction of the wall portions 81 and 88. The housing 89 extends vertically upward in generally parallel relation to the wall portion 88 and to a point some distance above the top wall 91 of the unit 26 and above the sprockets 82 and 83. The side of the housing 89 facing the wall portion 88 is open within the confines of the unit, that is, from a point adjacent the floor 71 to a point in proximity to the top run of the upper chain 52. The inner side wall 92 of housing 89 is disposed in outwardly adjacent relation to the outer ends of the finger portions 72 of spindle guards 69 and presents a vertical forward edge disposed in rearward opposite relation to the junction betwen the inner and outer shield portions 79 and 81, the lower forward portion of side wall 92 being cut away to increase the bottom portion of the spindle side of the opening between said junction and the forward edge of side wall 92.

Figure 5:
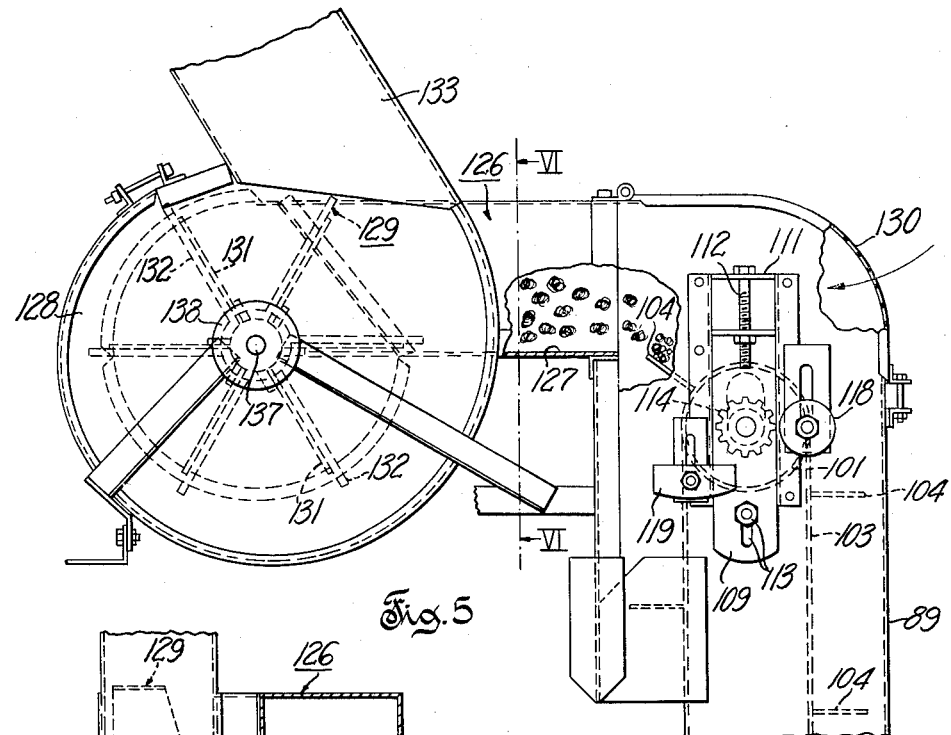
Fig. 5 is an enlarged side elevation, with parts broken away and shown in section, of the impeller, the upper end of the conveyer, and the duct structure.
Figure 6:
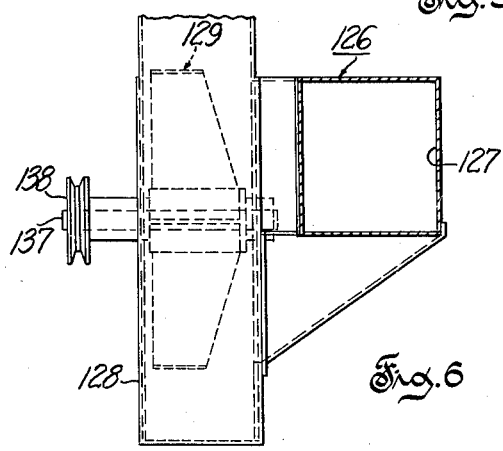
Fig. 6 is a section taken on line VI—VI of Fig. 5.

Referring also to Fig. 3, housing 89 is provided with a bottom structure 93 comprising a horizontal wall portion 94 disposed within the confines of the housing and merging with an upwardly inclined front end wall portion 96 which in turn merges with a lateral extension 97 thereof which is inclined downward and inward toward the outer end of the trash discharge opening 86. The horizontal wall portion 94 also merges with an inner vertical section 98 forming in effect a downward continuation of the inner side wall 92. End portion 96, extension 98 and section 92 merging with a horizontally inward extending portion 99 overlying the spindle guards 69, and a portion of the trash discharge opening 86, the forward inner edge of portion 99 being disposed adjacent and angled in conformity with the rear edge of the lower stripping element 73. Housing 89 operatively mounts an endless conveyer comprising upper and lower pulleys 101 and 102, respectively, and a flexible belt 103 provided with a series of longitudinally spaced flights 104 presenting saw tooth outer edges 106. The lower pulley is rotatably mounted in suitable pairs of fixed bearings 107 whereas the upper pulley (note Figs. 4 and 5) is mounted in a pair of bearings 108 carried by a pair of vertically adjustable bearing blocks 109, the latter being suspended from a pair of fixed parts 111 by bolts 112. In addition, the lower ends of these blocks include releasable guide means comprising a cap screw and vertical slot arrangement 113.

The near side of the shaft mounting the upper pulley 101 is provided with a drive sprocket 114 and power is transmitted thereto from a combined belt pulley and sprocket 116 by means of a chain 117, an idler sprocket 118 and a chain tightener 119. The combination pulley and sprocket 116 is operatively mounted on a horizontally disposed shaft 121 and has an additional sprocket element which is connected by a chain 122 with a sprocket 123 on the near side end of a horizontal shaft 124 having its opposite or inner end suitably geared by means not shown to the power input shaft 57. In this connection, it should suffice to know that rotation of input shaft 57 results in power being simultaneously transmitted to shafts 62, 54, 124, and 121 and to the upper pulley sprocket 114. Pulleys 101 and 102 rotate clockwise as viewed in Figs. 1 and 3 and consequently the flights move successively from the elevating to the descending side of the conveyer about the upper end of the latter. The saw tooth edges of the upwardly moving flights are disposed in spaced opposed relation to the vertical wall structure formed by the portions 88 and 81. Further, it will be noted that the flights in traveling through the well portion formed in part by the wall sections 94, 96 and 98 of the bottom structure sweep upward over the inclined section 96 in proximity thereto whereby trash gravitating into the well is moved upward therefrom and onto the downward and inward inclined section 97 which directs the trash toward the discharge opening 86.

The reference character 126 in Figs. 1, 4, 5 and 6 generally designates a duct structure for conveying cotton from the picking unit 26 to a receptacle 136 on the tractor. A rearward part of the duct structure 126 is formed by the upper portion of the housing 89, that is, by the portion above pulley 101, and the part of the duct structure which connects the upper part of the housing 89 with the receptacle 136 includes a cotton conveying passage 127 for conveying cotton from the upper interior part of housing 89 to the inlet of a casing 128 which encloses a rotary impeller 129. It will be noted that the duct structure 126 communicates in cotton receiving relation with the upper side of the housing 89 and that the duct work which includes the cotton conveying passage 127 and impeller casing 128 is disposed to extend laterally away from the upper portion of the elevating side of the conveyer 101 to 104, and is connected in cotton delivering relation with the receptacle 136. Further, the upper portion of housing 89 which forms the rear part of duct structure 126 is provided with a curved screen cover member 130 constituting an air admission opening which in general is more remote from the impeller casing 128 than is the elevating run of the conveyer belt 103. The lower forward terminal portion of structure 126 which is in part of conical configuration is inclined downwardly, note Figs. 4 and 6, to attain a more efficient introduction of cotton into the eye of the casing 128. That is, the impeller or blower end of the structure presents a curved terminal wall portion sloping toward and enclosing the axial inlet so that cotton enters the casing 128 in the general direction of blade movement thus minimizing impact between the blades and the cotton. The impeller 129 or air flow inducing device is provided with a series of radial blades 131 faced with rubber or other suitable material 132 to eliminate seed cracking. Further, it will be noted the ends of the blades 131 are spaced from the inner surface of the casing 128 a distance uniformly increasing radially from the point of cotton introduction to its point of discharge through the tangential outlet 133. This clearance affords free movement of the cotton in the induced air stream while minimizing blade interference and impact action. Therefore, while the increase in clearance may tend to decrease the suction effect, the provision of air inlet at the upper end of the housing 89 eliminates the necessity for attaining a high degree of suction which in turn minimizes power requirements. Also while it might be reasoned that a minimum of blade interference and impact action tends to reduce fluffing of the cotton bolls in passing through the impeller, this has not been found to be the case. Actually the overall result is to minimize seed cracking and the wear on relatively moving parts coupled with the cotton being in a fluffed state enabling it to be effectively conveyed through the spout 134 and into the receptacle 136 with a minimum of induced air, the shaft 137 of impeller 129 being provided with a V-belt pulley 138 drivenly connected with pulley 116 by means of a belt 139. In this connection, it is to be understood that the receptacle 136 is suitably mounted on a forward portion of the tractor, in a known manner, not shown, as the mounting of the receptacle forms no part of the present invention.

Referring again to Fig. 5, it is important to note that the flights 104 on belt 103 are spaced apart longitudinal distances such that as a cotton elevating flight moves upward into proximity to the bottom side of duct 127 the next flight in advance thereof has moved out of the path of the air stream entering through the admission opening provided by the cover 130. Consequently, an unobstructed stream of clean air sweeps over the cotton supporting flights as they move successively opposite the bottom of the duct 127. Further, the admission of air in this manner at a point relatively close to the impeller inlet not only minimizes suction requirements, but it also prevents subjecting the portion of housing 89 below the duct 127 to a suction effect which would interfere with the gravity separation of trash from cotton entering the elevating conveyor housing, which may be considered as including housing 89 and the forwardly spaced wall portions 81 and 88.

In operation, cotton removed from the spindles 68 by the stripping and cleaning mechanism passes through the opening between the front edge of inner side wall 92 of housing 89 and the junction between the disk shield wall portions 78 and 81. In other words, the elevating side of the conveyor housing 89 is provided with a material receiving opening disposed in laterally opposite cotton receiving relation to the cotton stripping and cleaning mechanism whereby cotton removed from the spindles by such mechanism is delivered into the path of the elevating conveyor flights 104. Consequently, since there is no suction effect produced in the conveyor casing below the duct 127, any trash carried along with the cotton removed from the spindles is free to gravitate toward the bottom of the unit, where through the coaction of the flights 104 with the well formed by wall sections 94, 96 and 98, coupled with the shape and inclination of wall section 97, results in the trash being moved toward the discharge opening 86, or at least out of the housing 89. In addition, the gravity separation of trash from the cotton is further enhanced by the spacing of the saw tooth edges of the flights 104 from the opposed vertical wall portions 81 and 88, since this spacing permits trash and in some instances cotton to fall downward therethrough, the cotton normally catching on a lower flight or the saw tooth edge thereof for subsequent movement into the air stream entering duct 127.

As a result, the capacity of the elevating conveyor may be kept to a minimum and its construction and operation made simple and inexpensive. Furthermore, as previously indicated, the combination herein shown and described affords numerous unexpected advantages as to an overall reduction in power requirements, a material improvement in freedom from dirt and trash entering the receptacle, and a marked improvement in maintenance and operating costs.

Therefore, while the disclosed apparatus constitutes a preferred embodiment of the invention, it is apparent that the novel coaction of parts and the principles involved may be attained with apparatus differing somewhat from that forming the basis of this disclosure. Consequently, it is to be understood that it is not intended to limit the protection to be secured to the exact details of construction and/or combination herein shown and described as various modifications within the scope of the appended claims may occur to persons skilled in the art.

It is claimed and desired to secure by Letters Patent:

1. In a cotton harvesting machine having a picking unit including vertical series of picking spindles and mechanism for stripping cotton from said spindles, and having a receptacle for picked cotton disposed in spaced relation to said picking unit, the combination comprising: an endless conveyor having flights thereon, a housing operatively enclosing said conveyor and extending vertically alongside said picking unit to a height somewhat above said series of spindles, said housing having its elevating side provided with a material receiving opening disposed in laterally opposite cotton receiving relation to said stripping mechanism; and a duct structure connected in cotton receiving relation with the upper side of said housing and including a cotton conveying passage disposed to extend laterally away from the upper portion of the elevating side of said conveyor and connected in cotton delivering relation with said receptacle, said duct structure having an air admission opening in a portion thereof more remote from said receptacle than the elevating side of said conveyor whereby air passing through said admission opening and duct toward said receptacle flows directly over the flights on the elevating side of said conveyor as they move opposite said passage; and means for effecting a flow of air through said admission opening and duct in a direction toward said receptacle.

2. In a cotton harvesting machine having a picking unit including vertical series of picking spindles and mechanism for stripping cotton from said spindles, and having a receptacle for picked cotton disposed in spaced relation to said picking unit, the combination comprising: an endless conveyor having flights thereon, a housing operatively enclosing said conveyor and extending vertically alongside said picking unit to a height somewhat above said series of spindles, said housing having its elevating side provided with an opening approximately coextensive with the vertical extent of said series of spindles and disposed in laterally opposite cotton receiving relation to said stripping mechanism; an air flow inducing device operatively associated with said machine in offset relation to an upper portion of the elevating side of said conveyor and having a discharge adapted for connection with said receptacle; and a duct structure communicating in cotton receiving relation with the upper side of said housing and including a cotton conveying passage disposed to extend laterally away from the upper portion of the elevating side of said conveyor and connected in cotton delivering relation with the inlet of said air flow inducing device, said duct having an air admission opening in a portion thereof more remote from said device than the elevating side of said conveyor whereby air passing through said admission opening in the direction toward said device flows directly over the flights on the elevating side of said conveyor as they move opposite said cotton conveying passage.

3. In a cotton harvesting machine having a picking unit including vertical series of picking spindles and mechanism for stripping cotton from said spindles, and having a receptacle for picked cotton disposed in spaced relation to said picking unit, the combination comprising: an endless conveyer having flights thereon, a housing operatively enclosing said conveyer and extending vertically alongside said picking unit to a height somewhat above said series of spindles, said housing having its elevating side provided with an opening disposed in laterally opposite cotton receiving relation to said stripping mechanism; an enclosed air flow inducing impeller operatively associated with said machine and having a discharge duct connected with said receptacle and an inlet duct disposed in laterally offset relation to an upper portion of the elevating side of said conveyer; said inlet duct being connected in cotton receiving relation with the upper portion of the elevating side of said conveyer and in being connected in cotton delivering relation with the intake of said impeller, said housing having an air admission opening in a portion thereof more remote from said impeller than the elevating side of said conveyer whereby air drawn through said admission opening flows directly over the flights on the elevating side of said conveyer as they move opposite said inlet duct.

4. In a cotton harvesting machine having a picking unit including vertical series of picking spindles and mechanism for stripping cotton from said spindles, and having a receptacle for picked cotton disposed in spaced elevated relation to said picking unit, the combination comprising: an endless conveyer having flights thereon, a housing operatively enclosing said conveyer and extending vertically alongside said picking unit to a height somewhat above said series of spindles and below the top side of said receptacle, said housing having its elevating side provided with an opening disposed in laterally opposite cotton receiving relation to said stripping mechanism; an air flow inducing device operatively associated with said machine in laterally offset relation to and somewhat below the upper portion of the elevating side of said conveyer, said device having a discharge duct connected with a top portion of said receptacle; and a passage connected in cotton receiving relation with the upper side of said housing and disposed to extend horizontally away from the upper portion of the elevating side of said conveyor, said passage presenting a downwardly inclined terminal portion communicating in cotton delivery relation with the intake of said device, said housing having an air admission opening in a portion thereof more remote from said air flow inducing device than the elevating side of said conveyer whereby air passing through said admission opening in the direction of said device flows directly over the flights on the elevating side of said conveyer as they move opposite said passage.

5. In a cotton harvesting machine having a picking unit including vertical series of picking spindles and mechanism for stripping cotton from said spindles, and having a receptacle for picked cotton disposed in spaced relation to said picking unit, the combination comprising: an endless conveyer having flights thereon, a housing operatively enclosing said conveyer and extending vertically alongside said picking unit to a height somewhat above said series of spindles, said housing having its elevating side provided with an opening disposed in laterally opposite cotton receiving relation to said stripping mechanism; an air flow inducing impeller operatively associated with said machine and having one or more blades faced with resilient material and enclosed in a casing spaced radially from the free ends of said blades, said casing having an outlet in communication with said receptacle and an inlet disposed in laterally offset relation to an upper portion of the elevating side of said conveyer; and a duct structure connected in cotton receiving relation with the upper side of said housing and including a cotton conveying passage disposed to extend laterally away from the upper portion of the elevating side of said conveyer and connected in cotton delivering relation with said casing inlet; said duct structure having an air admission opening in a portion thereof more remote from said casing than the elevating side of said conveyer whereby air drawn through said admission opening in the direction toward said casing flows directly over the flights on the elevating side of said conveyer as they move opposite said passage.

6. In a cotton harvesting machine having a picking unit including vertical series of picking spindles and mechanism for stripping cotton from said spindles, and having a receptacle for picked cotton disposed in spaced elevated relation to said picking unit, the combination comprising: an endless conveyer having flights thereon, a housing operatively enclosing said conveyer and extending vertically alongside said picking unit to a height somewhat above said series of spindles and below the top side of said receptacle, said housing having its elevating side provided with an opening disposed in laterally opposite cotton receiving relation to said stripping mechanism; an air flow inducing impeller operatively associated with said machine and having one or more blades faced with resilient material and enclosed in a casing spaced radially from the free ends of said blades sufficiently for the passage of cotton therebetween, said casing having an outlet in communication with said receptacle and an inlet disposed in laterally offset relation to and somewhat below an upper portion of the elevating side of said conveyer; and a duct structure connected in cotton receiving relation with the upper side of said housing and including a cotton conveying passage disposed to extend laterally away from the upper portion of the elevating side of said conveyer and presenting a downwardly inclined terminal portion communicating with the inlet of said casing, said duct structure having an air admission opening in a portion thereof more remote from said casing than the elevating side of said conveyer whereby air passing through said admission opening in the direction toward said casing flows directly over the flights on the elevating side of said conveyer as they move opposite said passage.

7. In a cotton harvesting machine having a picking unit including vertical series of picking spindles and mechanism for stripping cotton from said spindles, and having a receptacle for picked cotton disposed in spaced relation to said picking unit, the combination comprising: an endless conveyer having flights thereon, a housing operatively enclosing said conveyer and extending vertically alongside said picking unit to a height somewhat avove said series of spindles, said housing having its elevating portion spaced from said flights and provided with a side opening disposed in laterally opposite cotton receiving relation to said stripping mechanism whereby foreign material entering said conveyer along with said cotton may graviate to the bottom of said housing; means operative to withdraw foreign material from the bottom of said housing; a blower operatively associated with said machine and having an outlet communicating with said receptacle and an inlet disposed in laterally offset relation to an upper portion of the elevating side of said conveyer; and a duct structure connected in cotton receiving relation with a portion of said housing above said opening and including a cotton conveying passage disposed to extend laterally away from the upper portion of the elevating side of said conveyer and connected in cotton receiving relation with the inlet of said blower, said duct structure having an air admission opening in a portion thereof more remote from said blower than the elevating side of said conveyer whereby air drawn through said admission opening in the direction of said blower flows directly over the flights on the elevating side of said conveyer as they more opposide said passage.

8. In a cotton harvesting machine having a picking unit including vertical series of picking spindles and mechanism for stripping cotton from said spindles, and having a receptacle for picked cotton disposed in spaced relation to said picking unit, the combination comprising: a conveyer housing extending vertically alongside said picking unit to a height somewhat above said series of spindles, said housing having its elevating side provided with a material receiving opening disposed in laterally opposite cotton receiving relation to said stripping mechanism; a duct structure connected in cotton receiving relation with the upper side of said housing and including a cotton conveying passage disposed to extend laterally away from the upper portion of one side of said housing and connected in cotton delivering relation with said receptacle, said duct having an air admission opening in a portion thereof more remote from said receptacle than said one side of said housing; means for inducing a stream of air to flow through said admission opening, through the upper portion of said housing, and into said passage; and an endless conveyer operatively mounted in said housing with its elevating run spaced from the inner surface of said one side of said housing in opposite coacting relation thereto, said endless conveyer having flights thereon spaced apart longitudinal distances such that as a flight moves upward into proximity to the bottom portion of said passage the next flight in advance thereof has moved out of said air stream whereby an unobstructed stream of clean air sweeps over the cotton supporting flights as they move successively opposite the bottom of said passage.

9. In a cotton harvesting machine having a picking unit including vertical series of picking spindles and mechanism for stripping cotton from said spindles, a bottom wall provided with a trash discharge opening underlying said stripping mechanism on the spindle approaching side thereof, and having a receptacle for picked cotton disposed in spaced relation to said picking unit, the combination comprising: a conveyer housing extending vertically alongside said picking unit to a height somewhat above said series of spindles, said housing having one side thereof provided with a material receiving opening disposed in laterally opposite cotton receiving relation to said stripping mechanisem and having a bottom structure including a well portion having na upwardly inclined end wall merging with a lateral extension thereof which is inclined downward and inward toward the adjacent end of said discharge opening; a duct structure connected in cotton receiving relation with the upper side of said housing and including a cotton conveying passage disposed to extend laterally away from the upper portion of said one side of said housing and connected in cotton delivering relation with said receptacle, said duct structure having an air admission opening in a portion thereof more remote from said receptacle than said one side of said housing; means for inducing a stream of air to flow through said admission opening, across the upper portion of said housing, and into said passage; and an endless conveyer operatively mounted in said housing with its elevating run disposed in opposite adjacent relation to the inner surface of said one side of said housing, said conveyer having flights projecting therefrom sufficiently to sweep upward over said inclined end wall of said bottom structure in proximity thereto whereby trash gravitating into said well is moved upward therefrom and onto said extension thereof which is inclined downward toward said discharge opening.

10. In a cotton harvesting machine having a picking unit including vertical series of picking spindles and mechanism for stripping cotton from said spindles, a bottom wall provided with a trash discharge opening underlying said stripping mechanism on the spindle approaching side thereof, and having a receptacle for picked cotton disposed in spaced relation to said picking unit, the combination comprising: a conveyer housing extending vertically alongside said picking unit to a height somewhat above said series of spindles, said housing including a vertical end wall extending laterally outward from adjacent said stripping mechanism, an inner vertical side wall spaced from the inner edge of said end wall to form a cotton receiving opening extending vertically upward in coextensive relation to said series of spindles, and a bottom structure defining a well having a wall portion inclined upward toward the bottom of said end wall and merging with a laterally extending wall portion which is inclined downward and inward toward the adjacent end of said discharge opening; a duct structure connected in cotton receiving relation with the upper side of said housing and including a cotton conveying duct disposed to extend laterally away from the upper portion of said end wall side of said housing and connected in cotton delivering relation with said receptacle, said duct structure having an air admission opening in a portion thereof more remote from said receptacle than said end wall side of said housing; means for inducing a stream of air to flow through said admission opening, across the upper portion of said housing, and into said passage; and an endless belt operatively mounted in said housing with its elevating run extending outward from the vertical side of said cotton receiving opening formed by said side wall and in spaced opposite relation to said end wall, said belt having flights projecting therefrom sufficiently to sweep upward over said inclined wall portion of said bottom structure in proximity thereto whereby trash gravitating into said well is moved upward therefrom and onto said laterally extending wall portion.

11. In a cotton harvesting machine having a picking unit including vertical series of picking spindles and mechanism for stripping cotton from said spindles, and having a receptacle for picked cotton disposed in spaced relation to said picking unit, the combination comprising: an endless conveyer having flights thereon, a housing operatively enclosing said conveyer and extending vertically alongside said picking unit to a height somewhat above said series of spindles, said housing having its elevating side provided with an opening disposed in laterally opposite cotton receiving relation to said stripping mechanism; an air flow inducing impeller operatively associated with said machine and having one or more blades faced with resilient material and enclosed in a casing spaced radially from the free ends of said blades, said casing having a tangential outlet communicating with said receptacle and an axial inlet disposed in laterally offset relation to an upper portion of the elevating side of said conveyer; and a duct structure connected in cotton receiving relation with the upper side of said housing and including a cotton conveying passage disposed to extend laterally away from the upper portion of the elevating side of said conveyer and presenting a curved terminal wall portion sloping in the direction of blade movement toward and enclosing said axial inlet, said duct structure having an air admission opening in a portion thereof more remote from said casing than the elevating side of said conveyer whereby air drawn through said admission opening in the direction toward said casing flows directly over the flights on the elevating side of said conveyer as they move opposite said passage.

12. In a cotton harvesting machine, a system for delivering picked cotton from a picking unit into a storage receptacle, comprising an endless belt type elevating conveyer having cotton engaging flights arranged to move successively from the elevating to the descending side of said conveyer about the upper end of the latter; a duct structure communicating in cotton receiving relation with said conveyer at the upper end of said elevating side of the latter and including a cotton conveying passage disposed to extend laterally away from said elevating side of said conveyer and connected in cotton delivering relation with said receptacle, said duct structure having an air admission opening in a portion thereof more remote from said receptacle than said upper end of said elevating side of said conveyer, whereby air passing through said admission opening and duct toward said receptacle flows directly over the flights on the elevating side of said conveyer as they move past said passage; and means for effecting a flow of air through said admission opening and duct in a direction toward said receptacle.

References Cited in the file of this patent

UNITED STATES PATENTS

| Number | Name | Date |
|---|---|---|
| 946,454 | Mays | Jan. 11, 1910 |
| 1,229,598 | Fisher | June 12, 1917 |
| 1,810,386 | Berry | June 16, 1931 |
| 1,946,542 | Neighbour | Feb. 12, 1934 |
| 1,985,373 | Johnston | Dec. 25, 1934 |
| 2,241,423 | Rust | May 13, 1941 |
| 2,401,152 | Hagen | May 28, 1946 |
| 2,440,770 | Hagen | May 4, 1948 |
| 2,502,817 | Bennett | Apr. 4, 1950 |
| 2,513,259 | Walker | June 27, 1950 |
| 2,558,951 | Hagen et al. | July 3, 1951 |
| 2,668,330 | Gieszl | Feb. 9, 1954 |